(12) United States Patent
Grohs et al.

(10) Patent No.: US 6,250,713 B1
(45) Date of Patent: Jun. 26, 2001

(54) EXTRACTABLE SEAT

(75) Inventors: Ted M. Grohs, Novi, MI (US); Paul Bergmanis, Windsor (CA)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/360,232

(22) Filed: Jul. 23, 1999

Related U.S. Application Data

(60) Provisional application No. 60/094,143, filed on Jul. 24, 1998.

(51) Int. Cl.[7] ............... A61G 1/003; A61G 1/044; A61G 1/048
(52) U.S. Cl. ............... 297/183.6; 5/625; 5/627; 5/81.1 R; 224/157; 224/159
(58) Field of Search ............... 5/627, 625, 628, 5/626, 424, 81.1 R, 89.1; 297/183.6; 224/157, 159

(56) References Cited

U.S. PATENT DOCUMENTS

| | | | |
|---|---|---|---|
| 1,735,552 | * 11/1929 | Strauss et al. | 5/625 |
| 3,271,796 | * 9/1966 | Dillman | 5/627 |
| 4,124,908 | * 11/1978 | Burns et al. | 5/626 |
| 5,161,275 | * 11/1992 | Simpson et al. | 5/627 |
| 5,211,185 | * 5/1993 | Garth et al. | 5/628 |
| 5,515,549 | * 5/1996 | Wang | 5/627 |
| 5,579,546 | * 12/1996 | Griskauskas | 5/627 |
| 5,615,426 | * 4/1997 | Hokett | 5/89.1 |
| 5,979,983 | * 11/1999 | Galbreath | 297/256.15 |

* cited by examiner

Primary Examiner—Alexander Grosz
(74) Attorney, Agent, or Firm—MacMillan, Sobanski & Todd, LLC

(57) ABSTRACT

A vehicular seat for use in extracting a driver from a vehicle driver compartment of, for example, a racing vehicle. The seat includes a shell having a seat bottom and seat back. The seat further includes a securing strap for securing the driver to the seat. A plurality of receptacles are attached to the seat and are adapted to receive a lifting member, such as a plurality of straps. To extract the seat from the driver compartment the driver is secured to the seat by the securing strap. The lifting member is then secured to the seat. The lifting member is then raised to simultaneously extract the driver and seat from out of the driver compartment.

17 Claims, 6 Drawing Sheets

EXTRACTABLE SEAT

CROSS REFERENCE TO RELATED APPLICATIONS

This application claims the benefit of U.S. Provisional Application No. 60/094,143 filed Jul. 24, 1998.

BACKGROUND OF THE INVENTION

This invention relates in general to a method of removing or extracting a driver from a vehicle, such as, from a racing vehicle having an open cockpit or open driver compartment.

Typically, racing vehicles have a driver compartment surrounded by body panels which form the exterior of the vehicle. In racing vehicles having an open driver compartment, the driver enters and exits the compartment through an opening exposing the upper portion of the compartment. The driver's head can be exposed from the compartment. A seat for the driver is disposed within the compartment. The seat can be fastened to the vehicle, such as by a plurality of bolts, or the seat can rest in the compartment unfastened to the vehicle. A safety belt harness secures the driver and the seat within the compartment.

Under certain circumstances, such as after an accident which has caused injury to the driver, the driver must be carefully removed or extracted from the driver compartment. The driver can be removed from the compartment by first unbuckling the driver from the safety belt harness and then lifting the driver off of the seat and remove the driver from the compartment through the opening. However, these procedures may injury to the driver because the posture or position of the driver's head, neck, torso, and/or limbs are often shifted relative to the rest of the body. This shifting can aggravate or even cause more severe injuries for the driver.

It has also been known to first secure the driver to a support prior to removal from the seat. The rigid support is a separate component provided by the safety or rescue team. A common support includes a plurality of rigid elongated strips arranged in a parallel planar orientation within a generally flat flexible fabric material. The support extends from the lower back to the head of the driver. The support is inserted behind the driver's back such that the strips are aligned with the spine of the driver. The support provides vertical support such that once the support is secured to the driver, the spine is generally immobilized from forward and rearward movement. The plurality of elongated strips allows the support to generally wrap around the back of the driver, while providing the vertical support. The support can be secured to the driver by a plurality of straps extending across the driver's lower back and chest. Once the support is secured, the driver is removed from the driver compartment by manually grabbing the body of the driver and lifting the driver vertically through the opening of the compartment. Once outside the compartment, the driver can be transferred to a conventional spinal board.

Although the use of the separate support can reduce some shifting of the driver's body during extraction, the driver's torso must be flexed forwardly to insert the support behind the driver. Lifting of the driver may impart injurious compressive forces on the driver's spine. Also, the support does not provide hip or upper leg support, and injuries can be aggravated during pivoting of the hip region. The straps which secure the driver to the support may also hinder breathing.

BRIEF SUMMARY OF THE INVENTION

This invention relates in general to an improved seat for use in a vehicle, such as a racing vehicle, and a method of simultaneously extracting the seat and the driver from a driver compartment of the vehicle.

The seat includes a shell having a seat bottom and seat back which generally conforms to the body of the driver. The seat further includes at least one securing strap for securing the driver to the seat. Preferably, the seat includes a plurality of straps for securing the legs, hip region, and torso of the driver to the seat. The straps can be previously attached to the seat or separate from the seat and brought by an emergency crew, for example, during extraction of the seat. A plurality of receptacles are attached to the seat and are adapted to receive a lifting member, such as a plurality of straps which are raised to lift the seat and driver from out of the compartment.

To extract the seat from the driver compartment the driver is first secured to the seat by the securing straps. The lifting member, such as attachment straps, is then secured to the seat. Preferably, the seat includes quick removable couplings to attach the attachment straps. The lifting member is then raised to simultaneously extract the driver and seat from out of the driver compartment.

Various objects and advantages of this invention will become apparent to those skilled in the art from the following detailed description of the preferred embodiment, when read in light of the accompanying drawings.

DETAILED DESCRIPTION OF THE INVENTION

Figure 1:
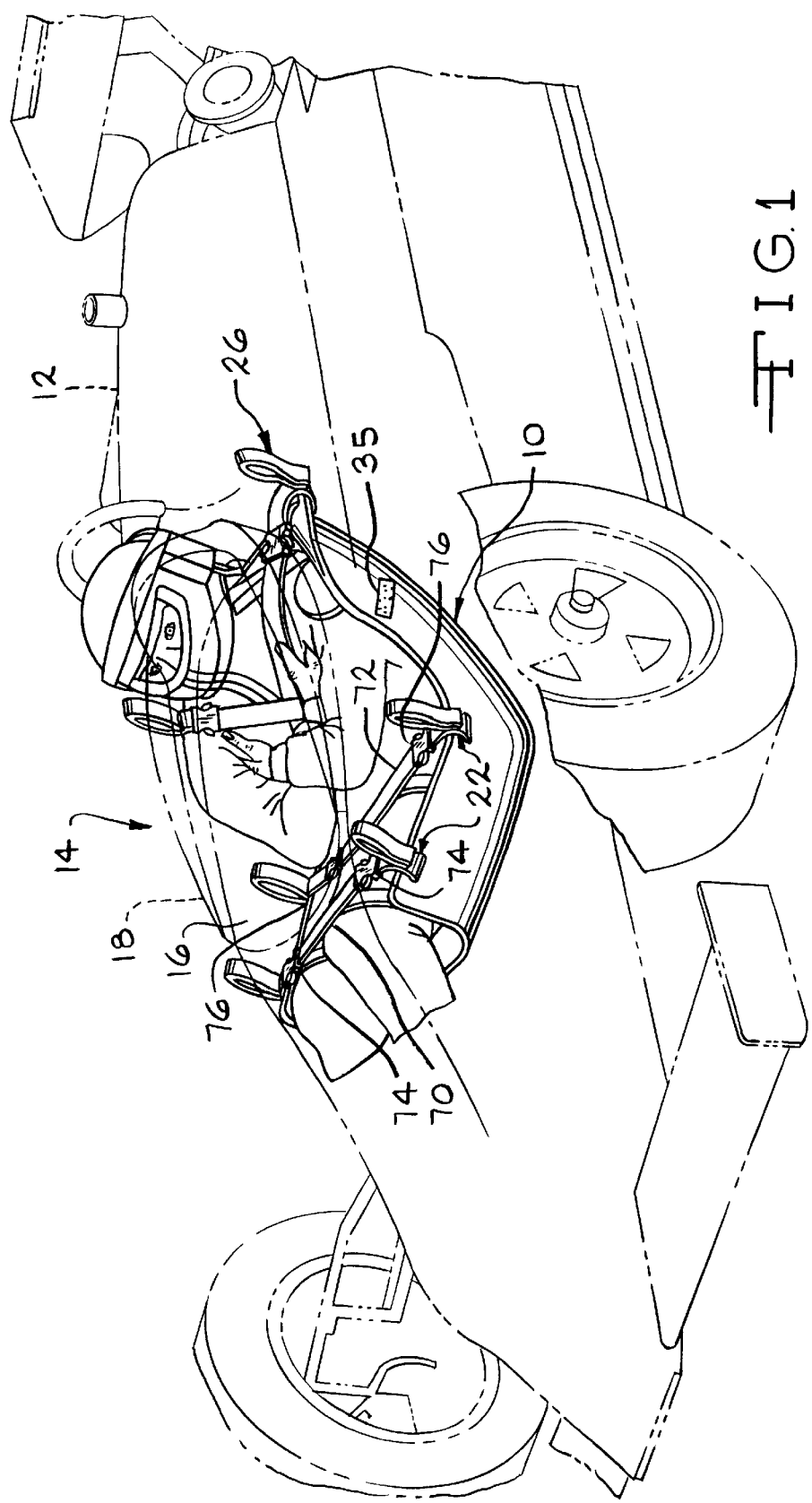
FIG. 1 is a perspective view of a driver secured to a vehicle seat, in accordance with the present invention, which is disposed in a driver compartment.

Referring now to the drawings, there is illustrated in FIG. 1 a vehicle seat, indicated generally at 10, in accordance with the present invention. As shown in FIG. 1, the seat 10 is disposed in a vehicle, indicated partially by phantom lines 12. The seat 10 is used for extracting or removing a driver from a vehicle driver compartment, indicated generally at 14, within the vehicle 12. The seat 10 and the method of extracting a driver, as explained in detail below, is particularly suited for removing drivers from racing vehicles wherein the driver enters and exits the compartment 14 through an opening 16 exposing the upper portion of the compartment 14. The seat 10 can be removably attached or unattached to the vehicle 12. If the seat 10 is removably attached to the vehicle, it is preferable that the seat 10 be attached so it can be removed quickly and easily, such as by only a few easily accessible bolts or releasable fixtures (not shown). The driver of the vehicle 12 is typically belted into the compartment by a safety belt harness (not shown). The safety belt harness can be any conventional harness including a plurality of straps which loop around the front of the driver with the ends of the straps secured to vehicle structures within the compartment 14. The safety belt harness secures the driver as well as the seat 10 within the compartment.

As will be described below, the vehicle 12 may include a generally U-shaped headrest 18. The headrest 18 is removably attached to the vehicle 12 and can be removed during extraction of the driver. The headrest 18 preferably includes a cushioning material, such as a urethane foam with hardened coating, on surfaces adjacent to the driver's head to help absorb impact forces during a collision.

Figure 2:
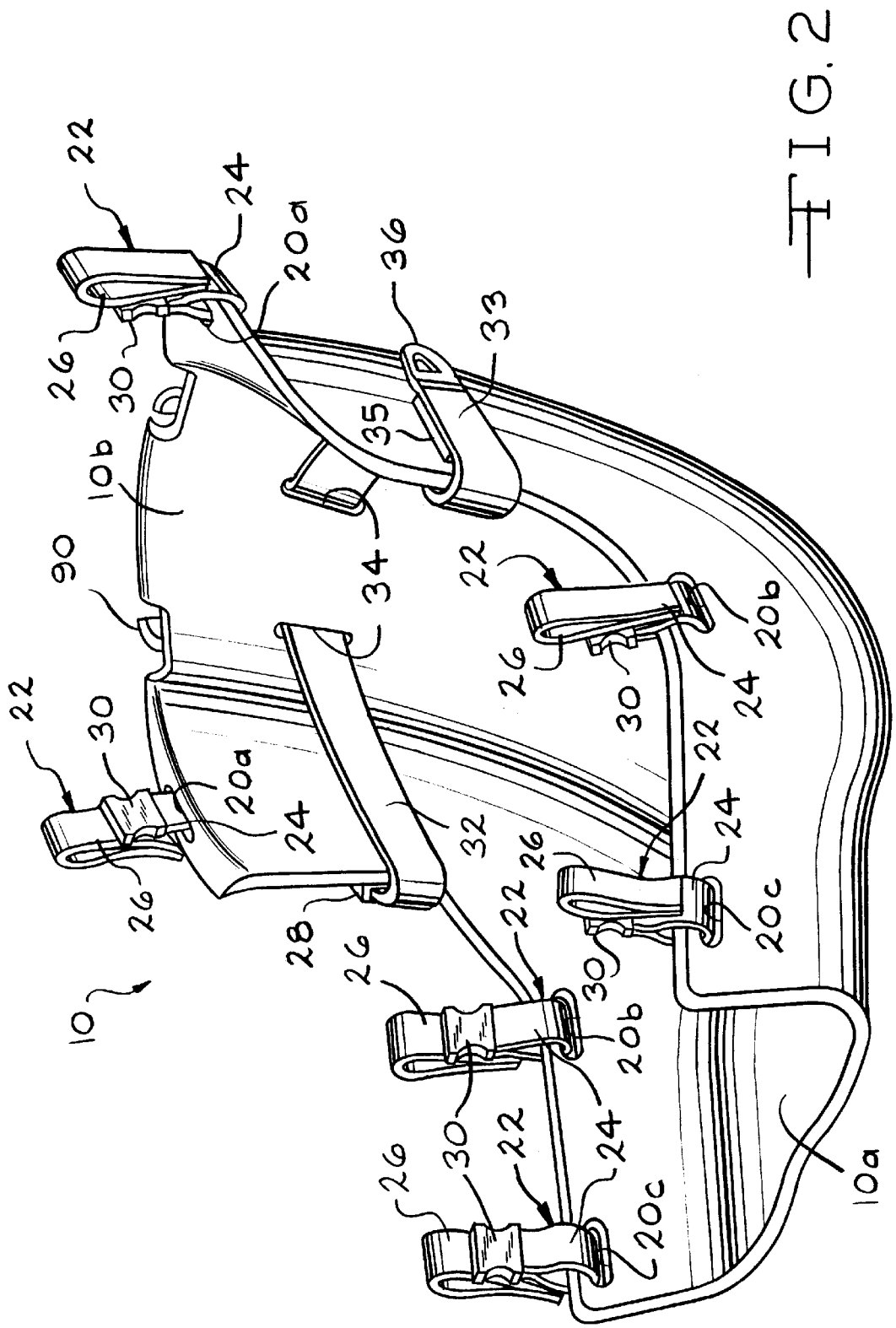
FIG. 2 is a perspective view of the seat illustrated in FIG. 1.

The seat 10 can be made of any suitable material, such as fiberglass or a carbon fiber compound shell. The seat 10 has a seat bottom 10a and a seat back 10b which are generally shaped to conform to the body of the driver. The seat 10 generally extends from the shoulders to the legs of the driver. If desired, the seat 10 can extend along the entire length of the legs. As shown in FIGS. 1–7, the seat 10 is in a generally fixed position when the seat is in or outside of the vehicle. The seat 10, or the shell of the seat 10, is relatively rigid such that the angular position between the seat back and the seat bottom is relatively fixed. Of course, the seat 10 can be made of a material, such as fiberglass or a carbon compound fiber, which is generally rigid but may flex or deform slightly while still generally conforming to the body of the driver. As best shown in FIG. 2, the seat 10 includes a plurality of slots formed therethrough located at various positions along the periphery of the seat 10. In the embodiment of the seat 10, as shown in FIG. 1, there are three pairs of slots 20a, 20b, and 20c. The first pair of slots 20a are generally located on either side of the shoulder area of the driver when the driver is seated in the seat 10. The second pair of slots 20b are generally located on either side of the hip region of the driver. The third pair of slots 20c are generally located on either side of the legs of the driver.

Preferably, the seat 10 further includes a plurality of receptacles, indicated generally at 22, which are fastened to the seat 10 at each of the slots 20a, 20b, and 20c. Each receptacle 22 is fastened to the seat 10 by a first loop 24 which is disposed within the respective slot 20. Of course, the receptacles 22 can be fastened to the seat 10 by any other suitable means, such as by riveting or integrally formed with the seat 10. Preferably, each receptacle 22 also includes a second loop 26 to be used as fastening means during removal of the seat 10 and the driver from the compartment, as will be described below. A coupling, such as a buckle 30, is attached to each receptacle 22. As will be described in detail below, the buckles 30 cooperate with various couplings and straps for securing the driver to the seat 10.

The seat 10 preferably includes a securing strap 32 which extends through a pair of slots 34 formed through the seat 10 generally located by the back of the driver when the driver is seated in the seat 10. Preferably, the strap 32 is fastened to the seat 10, such as by a stitching or hook and loop fasteners at a location between the slots 34 behind the seat 10. The ends of the strap 32 have couplings 36 fastened thereto. When the seat 10 is not being removed from the driver compartment of the vehicle, the couplings 36 and end portions of the strap 34 can be moved to a stowed position out of the way from the driver. For example, the strap 32 can have ends 33 which are removably attached to the seat 10 by cooperating hook and loop fasteners 35 attached to the seat 10 and the ends 33 of the strap 32. Thus, when not in use, the strap 32 extends behind the driver with the ends of the strap 32 being stowed in the pockets 28, out of the way. Alternatively, the seat 10 could be equipped with pockets (not shown) for storing the ends 33 of the strap 32.

Figure 3:
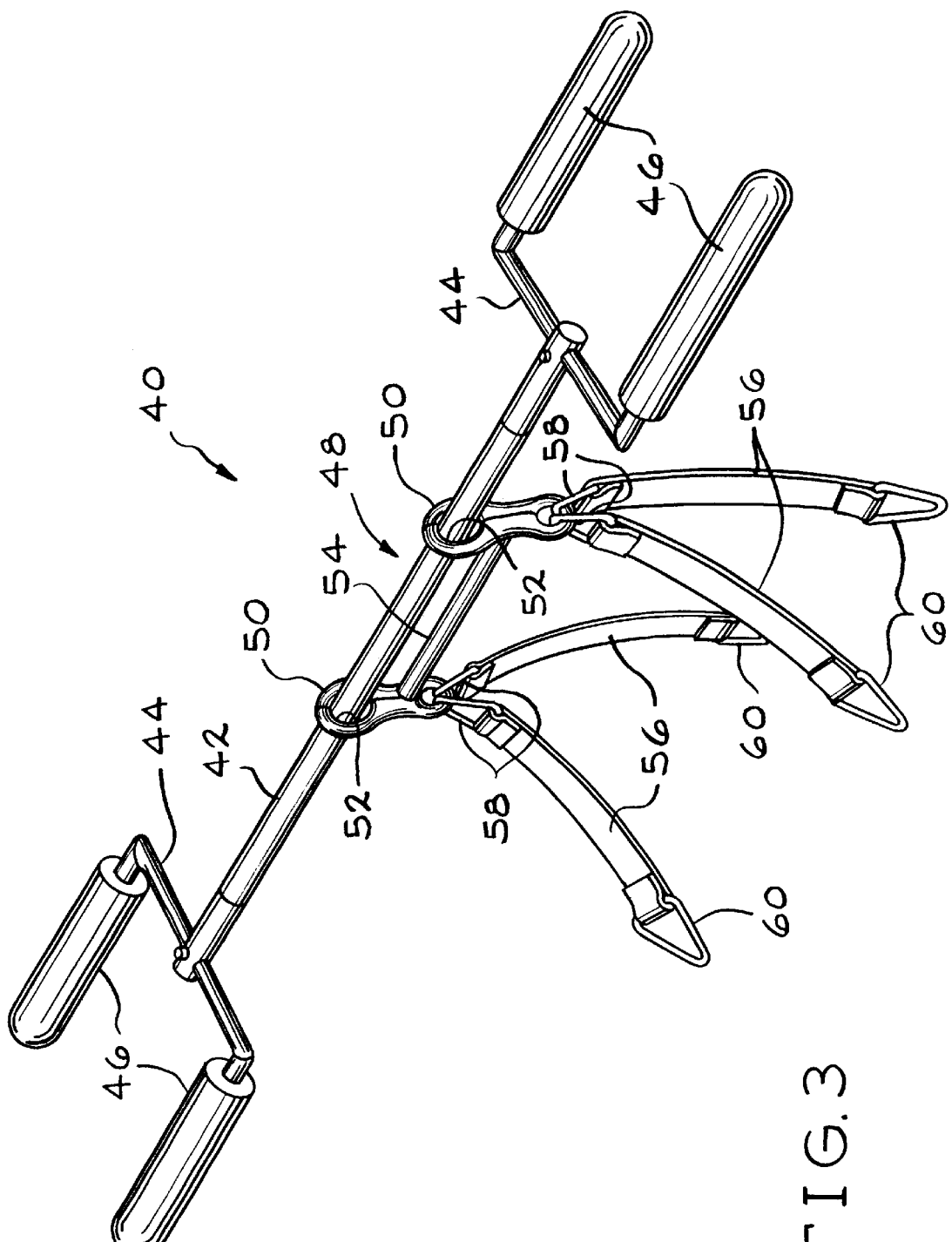
FIG. 3 is a perspective view of the carrier member illustrated in FIG. 1.
Figure 4:
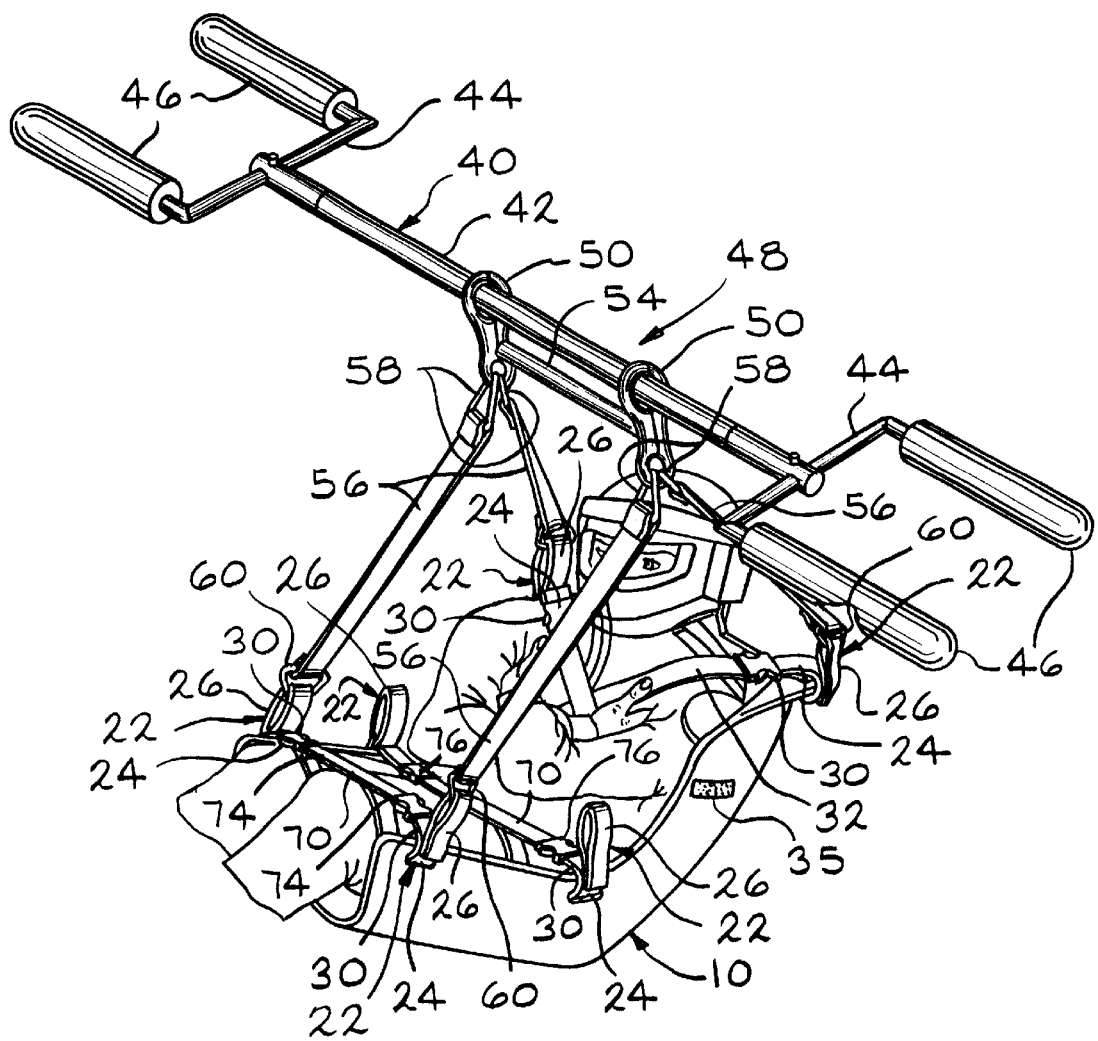
FIG. 4 is a perspective view of an optional carrier member secured to the seat to provide assistance in extracting the seat from the driver compartment.

To remove or extract the driver from the driver compartment of the vehicle, an emergency crew may use an optional carrier member, indicated generally at 40 and illustrated in FIG. 3. The operation of the carrier member 40 and attachment to the seat 10 will be explained in detail below. The carrier member 40 includes a central bar 42. At each end of the central bar 42 are U-shaped supports 44. The U-shaped supports 44 are designed so that each support 44 is placed on the shoulders of an emergency crew member. Preferably, the supports 44 are provided with padding material 46.

The carrier member 40 further includes a base, indicated generally at 48. The base 48 can have any suitable structure, and preferably is movable along the length of the central bar 42 and pivotable in a lateral direction with respect to the central bar 42. In the embodiment of the base 48 illustrated in FIG. 3, the base 48 includes a pair of sliders 50. The sliders 50 have openings 52 for receiving the central bar 42. The sliders 50 are spaced apart from one another by a rod 54. A pair of attachment straps 56 is attached to each of the sliders 50. As will be explained below, the straps 56 function as lifting members to provide means for lifting the seat 10 and the driver from out of the driver compartment 14. Each of the straps 56 has a first end having a ring 58 attached thereto, and a second end having a ring 60 attached thereto. The rings 58 couple the straps 56 to the sliders 50. The rings 60 are adapted to be removably coupled to the second loops 26 of the receptacles 22. Preferably, the rings 58 and 60 have slots or hinged portions for quick fastening and removal to the sliders 50 and loops 26, respectively. Preferably, the carrier member 40 can be disassembled into individual smaller parts, such as connectable tubular members, for ease of transportation and improved packaging constraints.

The operation of the seat 10 and the carrier member 40 will now be described. In normal conditions, the seat 10 and the driver of the vehicle are secured to the vehicle within the driver compartment by the safety belt harness (not shown). When it is desired to remove or extract the driver, an emergency crew unbuckles the driver from the safety belt harness. Next, the emergency crew secures the driver to the seat 10. The driver can be secured to the seat 10 by any suitable manner. Preferably, the emergency crew provides a pair of straps 70 and is 72, as shown in FIG. 1. The ends of the straps 70 and 72 have couplings 74 and 76, respectively, for coupling with associated buckles 30. Of course, any suitable coupling means can be used. The couplings 74 of the strap 70 are secured to the buckles 30 of the receptacles 22 disposed in slots 20c generally located adjacent the driver's legs. The couplings 76 of the strap 72 are secured to the buckles 30 of the receptacles 22 disposed in slots 20b generally located adjacent the driver's hip region. The straps 72 and 74 generally secure the legs and hip region of the driver to the seat 10.

To secure the upper body of the driver to the seat 10, the strap 32 is used. The ends of the strap 32 are first removed from the pockets 28, or alternatively from hook and loop fasteners is used. Preferably, one end of the strap 32 is placed under the arms and crossed over the front of the driver so that the associated coupling 36 is coupled to the buckle 30 of the receptacle 22 disposed in the slot 20a on the other side of the seat 10, as shown in FIG. 1. The other end of the strap 32 is similarly placed under the arms and crossed over the front of the driver so that the coupling 36 is coupled to the buckle 30 of the receptacle disposed in the slot 20a on the other side of the seat 10. Thus, the ends of the straps 32 cross each other across the driver's chest region. This strap placement is preferred because the crossed strap 32 helps retract the shoulders of the driver back providing slight traction on the thoracic and lumbar vertebrae. Thus, the straps 32, 70, and 72 secure the driver to the seat 10. Of course, the driver can be secured to the seat 10 by fewer or more straps as desired.

After the driver has been secured to the seat 10, the carrier member 40 may be used to assist the emergency crew members in lifting the seat 10 from the compartment 14. The carrier member 40 is positioned over the driver to a position shown in FIG. 4. The carrier member 40 can be supported by a pair of crew members, each standing at the sides of the driver with the U-shaped supports 44 resting on their shoulders. If necessary, the seat 10 is unfastened to the vehicle. The carrier member 40 is then secured to the seat 10. The rings 60 of the straps 56 are coupled to any desired ones of the second loops 26 of the receptacles. As shown in FIG. 1, the straps 56 are coupled to the second loops 26 of the receptacles 22 adjacent the legs and shoulder portion of the driver. The second loops 26 which are not coupled to the rings 60, such as the second loops 26 of the receptacles 22 located adjacent the hip region of the driver, can be used as auxiliary handles. Of course, the carrier member 40 can be secured to the seat 10 by any suitable means, and can be provided with any number of straps 56 for coupling to any number of receptacles 22 on the seat 10.

After the carrier member 40 has been secured to the seat 10, the crew members lift the carrier member 40, thereby lifting the seat 10 and driver from out of the driver compartment. The driver can then be moved to safety. Preferably, the base 48 of the carrier member 40 is movable along the length of the central bar 42 and pivotable in a lateral direction with respect to the central bar 42 to provide any necessary adjustment to lift the seat 10 and the driver from the vehicle. For example, the vehicle can be located adjacent barriers which prevent the preferred placement of the emergency crew members supporting the carrier member 40 along the sides of the vehicle.

It should be understood that the carrier member 40 is not required in extracting the seat 10 and driver from the compartment 14. Alternatively, the straps, such as loose straps 56, can be secured to the seat 10 in a similar manner as described above. The free end of the straps can them be grasped by emergency crew members to manually lift the seat 10 and driver upward through the opening of the compartment 14. The free ends of the straps 56 can have suitable structures, such as handles or loops to assist in grasping. Thus, the use of loose straps 56 function as a lifting member to help raise the seat 10 and driver from out of the compartment 14.

Figure 5:
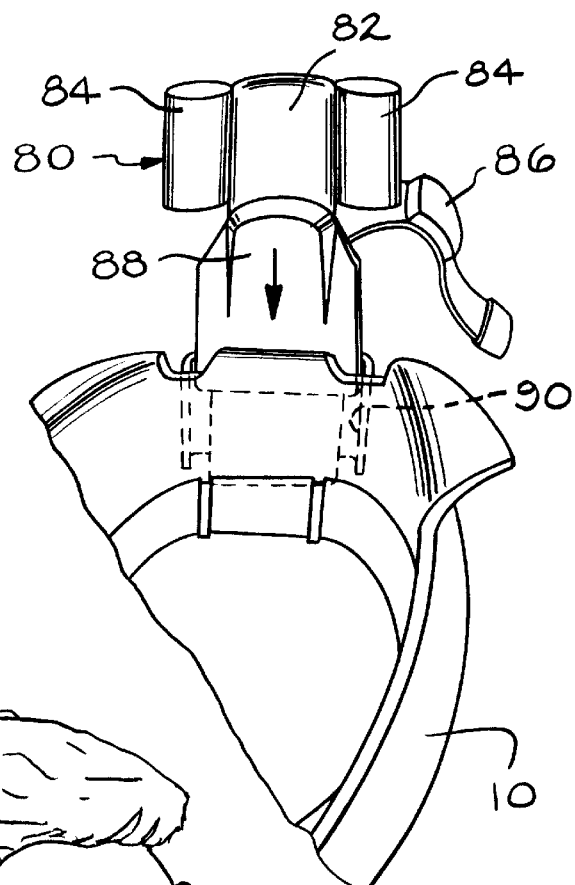
FIG. 5 is a frontal perspective view of an optional head stabilization bracket for use with the seat during extraction of the driver.
Figure 6:
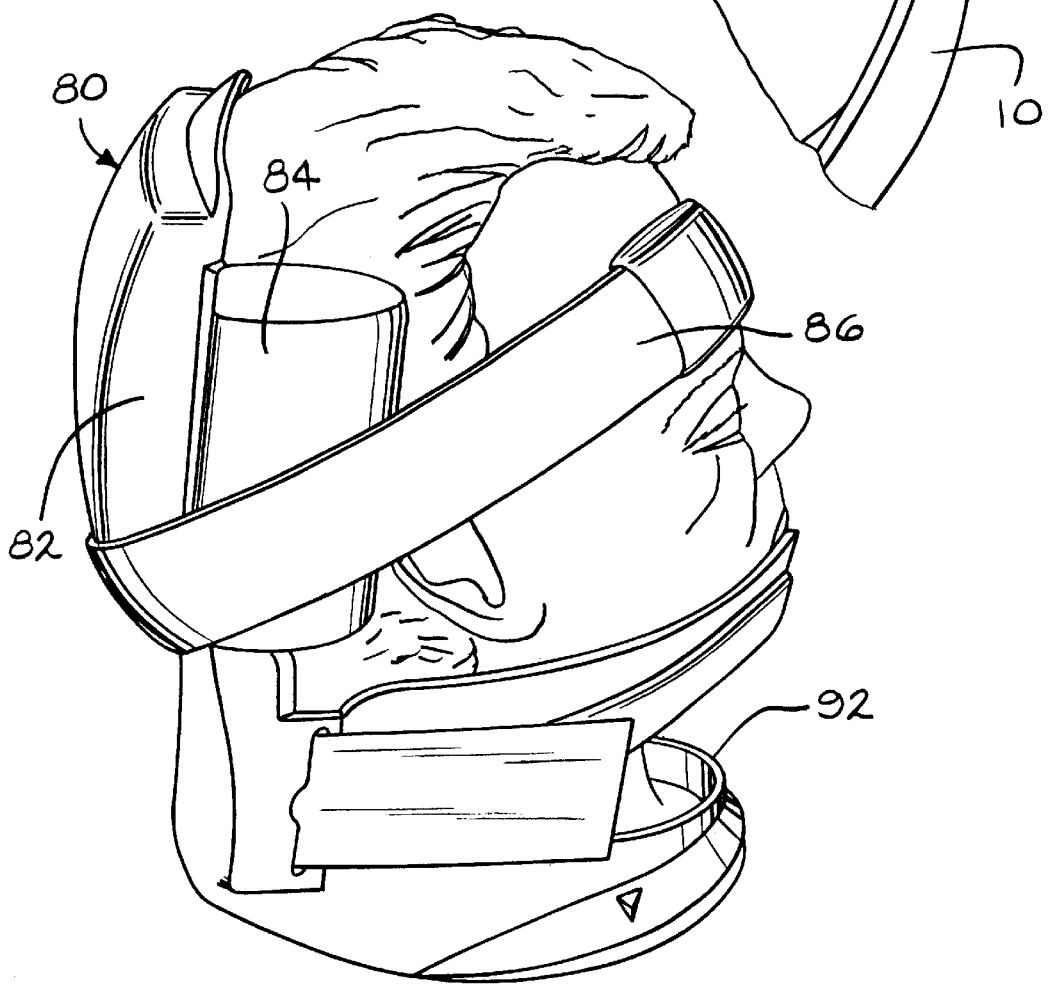
FIG. 6 is an enlarged side perspective view of the head stabilization bracket illustrated in FIG. 5, wherein the driver's head, without a helmet, is strapped to the head stabilization bracket.

There is shown in FIGS. 5 and 6 an optional head stabilization bracket, indicated generally at 80, which can be used with the seat 10 for stabilizing the head and neck of the driver during extraction. The bracket 80 can be any suitable generally rigid member for securing the driver's head. For example, the bracket 80 can simply be a generally straight board. As shown in FIGS. 5 and 6, the bracket 80 includes a main portion 82 for placement along the back of the head of the driver. The bracket 80 preferably includes a pair of side panels 84 for placement along the side of the head of the driver. The side panels 84 can be hinged to the main portion 82, such as by an integrated living hinge. If hinged, stops (not shown) are preferably provided on the bracket 80 for proper positioning of the side panels 84. Preferably, the bracket 80 is padded where the bracket contacts the driver's head. The bracket 80 further includes a strap 86 for securing the driver's head to the bracket 80. The strap 86 can provide slight traction on the neck of the driver which helps to avoid potential dislocation of unstable vertebrae. The strap 86 can be fastened to the bracket 80 by any suitable means.

Preferably, the head stabilization bracket 80 is not integral with the seat 10, but rather is a separate component which can be secured to the seat 10 when desired, such as when it is suspected that the driver may have neck or spinal injuries. The bracket 80 can, therefore, be provided by the emergency crew. The bracket 80 should be able to be quickly and accurately secured to the seat 10. In the embodiment shown in FIG. 5, the bracket 80 has a mounting plate 88 which slides into a track 90 formed in a back portion of the seat 10. Preferably, the plate locks into place when properly positioned within the track 90. Of course, any suitable securing means can be used. Preferably, the track 90 and the mounting plate 88 are designed to place the bracket 80 at the proper placement for the particular driver of the vehicle. For example, the mounting plate 88 can be a set standard size with the tracks 90 having different heights to match to each particular driver. The bracket 80 can also be used in cooperation with a conventional neck brace 92, as shown in FIG. 6.

The head stabilization bracket 80 can be used when the driver is wearing a helmet, as shown in FIG. 1, or not wearing a helmet, as shown in FIGS. 5 and 6. For quick extraction, the helmet can be left on the driver and the strap 86 is placed around the front the helmet adjacent the forehead of the driver. With the helmet left on, the head is positioned slightly downward, assisting in protecting the spinal cord by allowing the greatest room in the spinal canal minimizing the risk of compression of the spinal cord. The bracket 80 and the helmet may also be provided with locating members (not shown), such as pins and slots, for proper alignment of the helmet relative to the bracket 80. If it is suspected that the driver may have difficulty breathing, the helmet can be taken off permitting access for life support procedures to facilitate airway management procedures. In this case, the strap 86 is placed directly around the driver's forehead.

Figure 7:
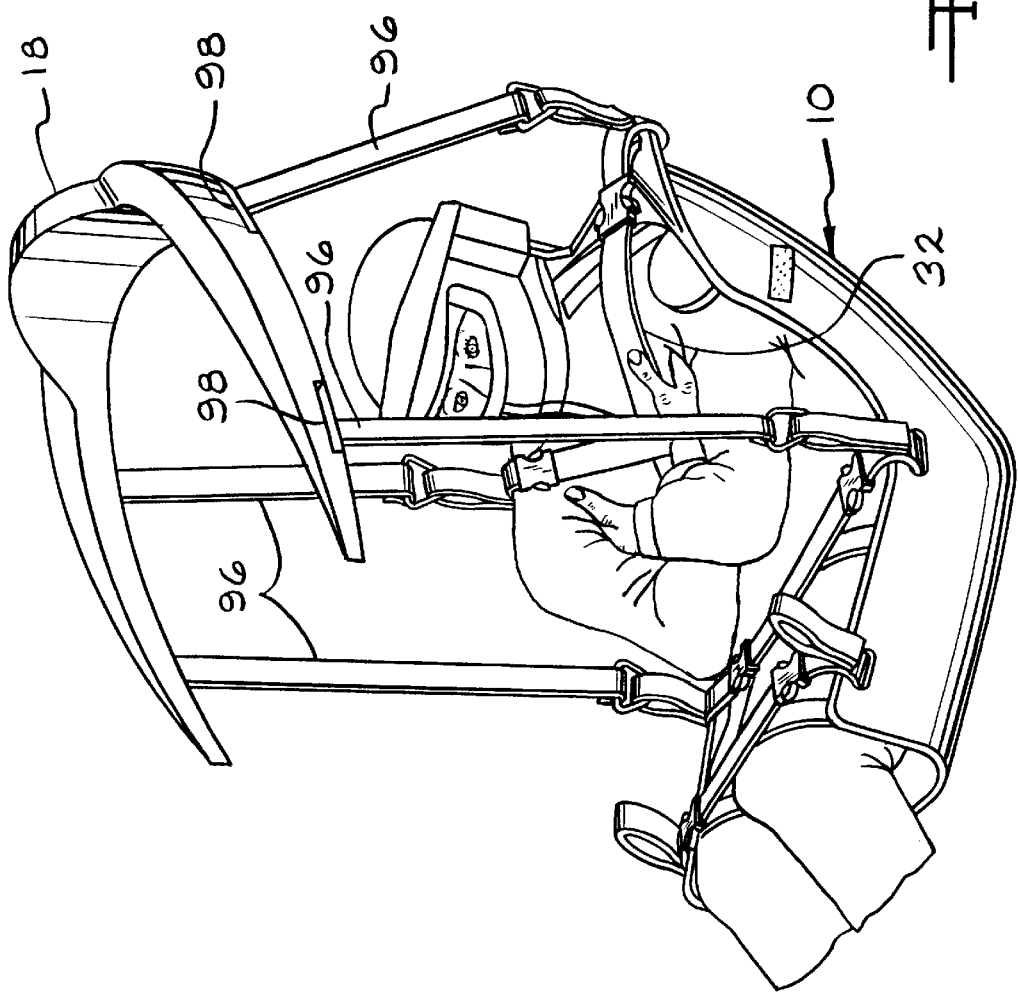
FIG. 7 is a perspective view of the headrest of the vehicle illustrated in FIG. 1 which is secured to the seat and is used in extraction the seat from the driver compartment.

There is illustrated in FIG. 7 an alternate embodiment of a lifting member, such that the headrest 18 of the vehicle 10 is used to assist in lifting the seat 10 and driver from out of the driver compartment 14. As stated above, the headrest 18 is generally U-shaped and is removably fastened to the vehicle 12. The headrest 18 is an integral part of the vehicle and is cushioned to help absorb impact forces during a collision. The headrest 18 is positioned on the vehicle so that it surrounds the sides and the back of the driver's head. If necessary, the headrest 18 can be modified from a conventional headrest so as to be structurally able to support the load of the seat 10 and the driver. Preferably, the headrest 18 is attached to the vehicle so that it can be quickly removed, such as by a couple of locking pins (not shown). To extract the driver form the compartment, the headrest 18 is secured to the seat 10. The headrest 18 can be secured to the seat 10 by any suitable manner, such as for example, by a plurality of straps 96. The straps 96 can be secured to the headrest 18 and the seat 10 in a similar manner as the straps 56 of the carrier member 40, as described above. The straps 96 may be secured to both the seat 10 and the headrest 18 normally. Thus, the straps 96 can be tucked out of the way, such as by hook and loop fasteners. If the straps 96 have been previously attached, the seat 10 and the driver can be extracted from the compartment 14 by simply lifting the headrest 18 upwardly until the seat 10 clears the opening 16 of the compartment. The use of the headrest 18 can expedite the removal of the seat 10 and driver. If desired, the headrest 18 can be modified to include features, such as handholds 98 to provide easier handling of the headrest 18.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of extracting a driver from out of a vehicle driver compartment comprising the steps of:
   (a) providing a seat having a seat back and a seat bottom positioned within the driver compartment, the seat adapted to receive a lifting member and a securing strap, the seat including a shell which is relatively rigid such that the angular position between the seat back and the seat bottom is relatively fixed;
   (b) securing the driver to the seat by the securing strap;
   (c) securing the lifting member to the seat; and
   (d) raising the lifting member to simultaneously extract the driver and seat from of the driver compartment.

2. The method of claim 1, wherein the driver is secured to the seat by a plurality of securing straps.

3. The method of claim 1, wherein the lifting members are a plurality of straps.

4. The method of claim 1, wherein the lifting members are raised manually.

5. The method of claim 1, wherein the seat is adapted to receive a separate head stabilization bracket, and wherein prior to step (d) the method of extractin the driver including the steps of:
   (e) attaching the bracket to the seat so that the bracket is positioned adjacent the head of the driver; and
   (f) securing the head of the driver to the bracket.

6. The method of claim 5, wherein the head of the driver is secured to the bracket by a strap.

7. The method of claim 1, wherein the lifting member is a carrier having a support bar, a base movable with respect to the support bar, and a plurality of attachment straps attached thereto, and wherein the lifting member is secured to the seat by attaching free ends of the attachment straps to the seat.

8. The method of claim 1, wherein prior to step (c) the method further includes the step of removing the lifting members from a stowed position.

9. The method of claim 1, wherein the lifting member includes a headrest portion of the vehicle removably attached to the vehicle.

10. A vehicular seat for use in extracting a driver from a vehicle driver compartment, said seat comprising:
    a shell having a seat bottom and seat back, said shell being relatively rigid such that the angular position between the seat back and the seat bottom is relatively fixed;
    a securing strap for securing the driver to the seat, said shell adapted to receive said securing strap; and
    a plurality of receptacles attached to said seat adapted to receive a lifting member for raising the seat to extract the seat and driver from the driver compartment.

11. The seat of claim 10 further including a lifting member comprised of a plurality of attachment straps adapted to be attached to the seat.

12. The seat of claim 11, wherein the shell of the seat includes a plurality of receptacles attached thereto, said receptacles adapted to be removably attached to ends of the plurality of attachment straps.

13. The seat of claim 12, wherein said receptacles further include buckles adapted to receive couplings attached to said securing strap.

14. The seat of claim 10, wherein said securing strap is attached to the shell of said seat, and wherein said seat and said securing strap have cooperating hook and loop fasteners attached thereto for placing ends of said securing strap in a stowed position.

15. The seat of claim 10 further including a head stabilizing bracket adapted to be removably attached to a back portion of said shell such that said bracket is positioned adjacent the head of the driver when seated in said seat.

16. The seat of claim 15, wherein said shell includes a track formed in said back portion of said shell, said bracket having a plate which is adapted to slide in said track to removably attach said bracket to said shell.

17. The seat of claim 15, wherein said bracket includes a strap for securing the head of the driver to said bracket.

* * * * *

UNITED STATES PATENT AND TRADEMARK OFFICE
CERTIFICATE OF CORRECTION

PATENT NO. : 6,250,713 B1
DATED : June 26, 2001
INVENTOR(S) : Ted M. Grohs et al.

It is certified that error appears in the above-identified patent and that said Letters Patent is hereby corrected as shown below:

<u>Column 7, claim 1,</u>
Line 12, after "from" insert -- out --.

<u>Column 7, claim 5,</u>
Line 3, delete "extractin" and insert -- extracting --.

Signed and Sealed this

Twenty-ninth Day of January, 2002

Attest:

Attesting Officer

JAMES E. ROGAN
Director of the United States Patent and Trademark Office